United States Patent [19]

Eimers et al.

[11] 4,421,879

[45] Dec. 20, 1983

[54] USE OF 3,4-DISUBSTITUTED ANILINES AS ACCELERATORS FOR UNSATURATED POLYESTER RESINS

[75] Inventors: Erich Eimers; Klaus Kraft; Dieter Margotte, all of Krefeld, Fed. Rep. of Germany

[73] Assignee: Bayer Aktiengesellschaft, Leverkusen, Fed. Rep. of Germany

[21] Appl. No.: 412,513

[22] Filed: Aug. 30, 1982

[30] Foreign Application Priority Data

Sep. 12, 1981 [DE] Fed. Rep. of Germany ....... 3136292

[51] Int. Cl.³ .............................................. C08L 67/02
[52] U.S. Cl. .................................. 523/500; 523/514; 523/521; 525/21; 525/25
[58] Field of Search ...................... 525/25, 21; 523/500

[56] References Cited

U.S. PATENT DOCUMENTS

| 3,367,994 | 2/1968 | Parker | 525/25 |
| 3,914,200 | 10/1975 | Oswitch | 525/25 |
| 4,012,542 | 3/1977 | Oswitch | 525/25 |
| 4,046,740 | 9/1977 | Thornburrow | 525/25 |
| 4,259,228 | 3/1981 | Smearing | 525/25 |
| 4,284,551 | 8/1981 | Argentar | 525/25 |

FOREIGN PATENT DOCUMENTS 2649268  5/1978  Fed. Rep. of Germany .

*Primary Examiner*—John C. Bleutge
*Assistant Examiner*—Patricia Short
*Attorney, Agent, or Firm*—Connolly and Hutz

[57] ABSTRACT

Anilines substituted in the m- and p-position by an alkyl radical and a halogen atom are eminently suitable for use as accelerators for cold-hardening unsaturated polyester resins.

8 Claims, No Drawings

USE OF 3,4-DISUBSTITUTED ANILINES AS ACCELERATORS FOR UNSATURATED POLYESTER RESINS

This invention relates to the use of anilines substituted in the m- and p-position by an alkyl radical and a halogen atom as accelerators for cold-hardening unsaturated polyester resins (i.e. polyester resins which can harden at room temperature in the absence of externally applied heat), more particularly for filling compounds based on unsaturated polyester resins.

Filling compounds are required to show properties that are difficult to reconcile, namely:

1. a pot life which allows sufficient time for homogeneous distribution of the hardening catalyst in the resin and for application of the filling compound, coupled with a long shelf life,
2. ready sandability of the filled surface as soon as possible after application of the filling compound, and
3. high flexibility and surface hardness after hardening.

Sandability may be improved, albeit at the expense of pot life and shelf life, by high concentrations of accelerator. However, any attempt to improve pot life and shelf life by reducing the concentration of accelerator and/or by increasing the inhibitor content results in a deterioration in sandability.

As accelerators, aromatic amines differ considerably in their behaviour without any connection between their reactivity and the sandability of filling compounds accelerated therewith. In particular, it has been found that, although highly reactive amines lead to rapid hardening of the filling compound, they do not necessarily lead to early sandability.

It is known that moulding compositions, particularly filling compounds, based on cold-hardening cast polyester resins may be hardened using N,N-dialkyl aryl amines as polymerisation accelerators (U.S. Pat. No. 2,480,928). It is also known that N,N-bis-($\beta$-hydroxyalkyl)-aryl amines may be reacted with saturated or unsaturated dicarboxylic acids to form a polyester or with diisocyanates to form a polyurethane and that the resulting products - optionally after admixture with amine-free unsaturated polyester resins may be cold-hardened after dissolution with polymerisable monomers in the presence of diacyl peroxides (DE-PS No. 919,431, DE-OS No. 1,943,945 and DE-PS No. 1,643,927).

It is known from DE-OS No. 2,649,268 that mixtures of two specific accelerators provide filling compounds based on unsaturated polyester resins with a particularly advantageous combination of a favourable pot life, a long shelf life and early sandability. In their unhardened state, however, these filling compounds tend to turn blue or green in colour in the presence of quinones such as, for example, dibutyl quinone or chloranil. It would be undesirable not to use the above-mentioned inhibitors because they greatly increase the shelf life of the polyester resins and the filling compounds produced therefrom without seriously affecting their reactivity.

An object of the present invention is to provide a method of accelerating unsaturated polyester resin compositions which do not have any of the abovementioned disadvantages of conventional amine accelerators.

The present invention relates to the use of compounds corresponding to the following formula:

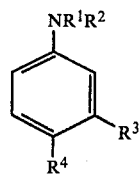

in which $R^1$ and $R^2$ which may be the same or different, represent a saturated or unsaturated, optionally OH-substituted hydrocarbon radical containing from 1 to 18 carbon atoms and preferably from 1 to 4 carbon atoms, more particularly a $\beta$-hydroxy-$C_2$-$C_3$-alkyl radical, and one of the two radicals $R^3$ and $R^4$ represents an optionally phenyl-substituted $C_1$-$C_4$-alkyl radical or a $C_5$-$C_6$-cycloalkyl radical, and the other of the two radicals $R^3$ and $R^4$ represents a halogen atom, preferably a fluorine, chlorine or bromine atom, as accelerators for unsaturated polyester resins.

Compounds in which both $R^1$ and $R^2$ represent a $\beta$-hydroxy $C_2$-$C_3$-alkyl radical are particularly preferred.

Preferred representatives of the compounds used in accordance with the invention are, for example,
N,N-diethyl-3-chloro-4-methyl aniline,
N,N-di-n-butyl-3-chloro-4-methyl aniline,
N,N-bis-($\beta$-hydroxyethyl)-3-chloro-4-methyl aniline,
N-methyl-N-$\beta$-hydroxyethyl-3-chloro-4-methyl aniline,
N,N-bis-($\beta$-hydroxypropyl)-3-chloro-4-methyl aniline,
N-methyl-N-$\beta$-hydroxypropyl-3-chloro-4-methyl aniline,
N,N-bis-($\beta$-hydroxyethyl)-3-chloro-4-tert.-butyl aniline,
N,N-bis-($\beta$-hydroxyethyl)-3-chloro-4-phenyl isopropyl aniline,
N,N-bis-($\beta$-hydroxypropyl)-3-fluoro-4-tert.-butyl aniline,
N,N-bis-($\beta$-hydroxyethyl)-3-fluoro-4-ethyl aniline,
N-$\beta$-hydroxyethyl-N-$\beta$-hydroxypropyl-3-bromo-4-methyl aniline,
N,N-bis-($\beta$-hydroxypropyl)-3-chloro-4-methyl aniline,
N,N-bis-($\beta$-hydroxylpropyl)-3-bromo-4-ethyl aniline,
N,N-bis-($\beta$-hydroxyethyl)-3-fluoro-4-methyl aniline,
N,N-bis-($\beta$-hydroxyethyl)-3-chloro-4-cyclohexyl aniline,
N,N-bis-($\beta$-hydroxypropyl)-3-fluoro-4-isopropyl aniline,
N-methyl-N-$\beta$-hydroxypropyl-3-bromo-4-methyl aniline,
N,N-dimethyl-3-chloro-4-methyl aniline,
N-$\beta$-hydroxyethyl-N-$\beta$-hydroxypropyl-3-chloro-4-methyl aniline,
N,N-diethyl-3-methyl-4-chloroaniline,
N,N-di-n-butyl-3-methyl-4-chloroaniline,
N,N-bis-($\beta$-hydroxyethyl)-3-methyl-4-chloroaniline,
N-methyl-N-$\beta$-hydroxyethyl-3-methyl-4-chloroaniline,
N,N-bis-($\beta$-hydroxypropyl)-3-methyl-4-chloroaniline,
N-methyl-N-$\beta$-hydroxypropyl-3-methyl-4-chloroaniline,
N,N-bis-($\beta$-hydroxyethyl)-3-tert.-butyl-4-chloroaniline,
N,N-bis-($\beta$-hydroxyethyl)-3-phenyl isopropyl-4-chloroaniline,
N,N-bis-($\beta$-hydroxypropyl)-3-tert.-butyl-4-fluoroaniline,
N,N-bis-($\beta$-hydroxyethyl)-3-ethyl-4-fluoroaniline, N-β-hydroxyethyl-N-β-hydroxypropyl-3-methyl-4-bromoaniline,
N,N-bis-(β-hydroxypropyl)-3-methyl-4-chloroaniline,
N,N-bis-(β-hydroxypropyl)-3-ethyl-4-bromoaniline,
N,N-bis-(β-hydroxyethyl)-3-methyl-4-fluoroaniline,
N,N-bis-(β-hydroxyethyl)-3-cyclohexyl-4-chloroaniline,
N,N-bis-(β-hydroxypropyl)-3-isopropyl-4-fluoroaniline,
N-methyl-N-β-hydroxypropyl-3-methyl-4-bromoaniline,
N,N-dimethyl-3-methyl-4-chloroaniline and
N-β-hydroxyethyl-N-β-hydroxypropyl-3-methyl-4-chloroaniline.

The most preferred representative of the compounds used in accordance with the invention is N,N-bis-(β-hydroxyethyl)-3-chloro-4-methyl aniline.

The compounds used in accordance with the invention may be used in quantities of from 1.0 to 10% by weight, preferably in quantities of from 1 to 5% by weight and, more particularly, in quantities of from 1.0 to 3% by weight, based on the unsaturated polyester resin.

The compounds used in accordance with the invention may be employed individually. However, mixtures thereof may also be used. It is also possible to mix the compounds used in accordance with the invention with up to 50 mole percent, based on 1 mole of total amine mixture, of N,N-dialkyl- or N,N-bis-(hydroxyalkyl)-p-alkyl aryl amines and to use the resulting mixtures as accelerators. Preferred p-alkyl aryl amines of this type are, for example, N,N-bis-(β-hydroxypropyl)-p-toluidine, N-methyl-N-β-hydroxyethyl-p-toluidine, N,N-bis-(β-hydroxypropyl)-3,4-dimethyl aniline, N,N-bis-(β-hydroxyethyl)-3,4-dimethyl aniline, N,N-bis-(β-hydroxyethyl)-4-t-butyl aniline and N,N-bis-(β-hydroxypropyl)-4-cyclohexyl aniline.

In one particularly preferred embodiment, the compounds used in accordance with the invention are used as accelerators in conjunction with the reaction products of N,N-bis-(β-hydroxyethyl)-aryl amines and dicarboxylic acids or diisocyanates according to DE-OS No. 2,649,268.

The compounds used in accordance with the invention may be added to the unsaturated polyester during or after dissolution in copolymerisable monomers.

In the context of the invention, "unsaturated polyester resins" are generally mixtures of from 30 to 75 parts by weight of α,β-ethylenically unsaturated polyesters and 70 to 25 parts by weight of unsaturated monomers copolymerisable therewith.

α,β-Ethylenically unsaturated polyesters of this type are the usual polycondensation products of at least one α,β-ethylenically unsaturated dicarboxylic acid generally containing 4 or 5 C-atoms or ester-forming derivatives thereof, optionally in admixture with up to 90 mole percent, based on the unsaturated acid components, of at least one aliphatic saturated dicarboxylic acid containing from 4 to 10 C-atoms or at least one cycloaliphatic dicarboxylic acid containing from 8 to 10 carbon atoms or at least one aromatic dicarboxylic acid containing from 8–12 carbon atoms or ester-forming derivatives thereof, with at least one polyhydroxy compound, particularly a dihydroxy compound, containing from 2 to 8 carbon atoms, i.e. polyesters of the type described, for example, by J. R. Lawrence in "Polyester Resins", Reinhold Publ. Corp., New York 1960, pages 18 et seq., and in Kunststoff-Handbuch, Vol. VIII ("Polyester"), Carl Hanser Verlag, Munich 1973, pages 247 to 312.

The polyesters generally have acid numbers of from 1 to 100 and preferably from 20 to 70, OH numbers of from 10 to 150 and preferably from 20 to 100, and molecular weights, measured as number averages $M_n$, of from about 500 to 5000 and preferably from about 1000 to 3000 (as measured by vapour pressure osmometry in dioxane and acetone; in the case of differing values, the lower value is taken as the correct value).

The most preferred copolymerisable monomer is styrene.

It is possible to use individual inhibitors and also mixtures of various inhibitors. In this connection, it is preferred to use mixtures which, in addition to hydroquinone and derivatives thereof, also contain quinones, such as for example chloranil or bromanil, benzoquinone, 2,5- or 2,6-dibutyl benzoquinone, in concentrations of from 0.01 to 0.1% by weight, based on unsaturated polyester resin.

Polymerisation initiators, preferably diacyl peroxides or percarbonates, are added to the polyester resins before hardening in quantities of from 1 to 10% by weight, based on the unsaturated polyester resin. Preferred initiators are, for example, diacetyl peroxide, dibenzoyl peroxide, di-p-chlorobenzoyl peroxide, phthaloyl peroxide, succinyl peroxide, dilauroyl peroxide, acetyl cyclohexane sulphonyl peroxide, isopropyl percarbonate, cyclohexyl percarbonate and bis-(4-t-butylcyclohexyl)-percarbonate.

To produce filling compounds, fillers such as chalk, talcum, baryta, asbestine, are added to the polyester resins in quantities of from 50 to 350 parts by weight, based on 100 parts by weight of polyester resins. Dyes, pigments and/or thixotropic agents such as Aerosil (Trade Mark) or hydrogenated castor oil may, of course, also be added. The various components of the moulding compositions according to the invention are best mixed in kneaders, dissolvers or on roll stands.

The filling compounds are distinguished by good dry sandability and a long shelf life. Even in the event of prolonged storage, they do not undergo any discolouration nor any loss of reactivity.

The filling compounds according to the invention are suitable, for example, for repairing coachwork panels, plastics panels and stone tiles of all kinds. Filling compounds accelerated in accordance with the invention are preferably used in the vehicle repair field.

The parts quoted in the following Examples represent parts by weight and the percentages are percentages by weight.

EXAMPLES

A. Production of the polyester resins

Polyester resin I

A polyester is produced by melt condensation from 89 moles of diethylene glycol, 13 moles of ethylene glycol and 98.1 moles of maleic acid anhydride. At the same time, 42.1 moles of dicyclopentadiene are added. The resin is then dissolved in styrene to form a 63% solution and stabilised with 0.04% of chloranil and 0.01% of copper naphthanate, based in each case on the pure polyester resin. The polyester resin obtained has a viscosity of 480 mPas (as measured at 25° C.) and an acid number of 10.

Polyester resin II

A polyester produced by melt condensation from 47.1 moles of maleic acid anhydride, 29.0 moles of tetrahydrophthalic acid anhydride and 80.6 moles of propylene glycol is dissolved in styrene to form a 65% solution and stabilised with 0.04% of chloranil and 0.008% of copper naphthanate, based in each case on the pure polyester resin. The polyester resin obtained has a viscosity of 1050 mPas (as measured at 25° C.) and an acid number of 26.

B. Production of the accelerators

1. Comparison

Amine accelerator I

A polyester is produced by polycondensation from 1 mole of N,N-bis-(β-hydroxypropyl)-p-toluidine and 0.774 mole of adipic acid and is dissolved in styrene along with 0.1% of hydroquinone to form a 70% solution.

Amine accelerator II

N,N-bis-(β-hydroxyethyl)-m-toluidine

Amine accelerator III

N,N-bis-(β-hydroxyethyl)-3,4-dimethyl aniline

2. According to the invention

Amine accelerator IV

N,N-bis-(β-hydroxyethyl)-3-chloro-4-methyl aniline

Amine accelerator V

N,N-bis-(β-hydroxyethyl)-3-fluoro-4-methyl aniline

Amine accelerator VI

A mixture of 65 parts of accelerator IV and 35 parts of accelerator I.

Amine accelerator VII

N,N-bis-(β-hydroxyethyl)-4-chloro-3-methyl aniline

C. Production of the filling compounds

Quantities of 100 parts of polyester resin I or II are homogenised with the particular accelerator, 130 parts of talcum, 60 parts of heavy spar and 7 parts of titanium dioxide (rutile).

The quantity of accelerator is measured in such a way that, in all the filling compounds produced using resin I, the nitrogen content amounts to 0.038% and, in all the filling compounds produced using resin II, to 0.027%, based on the total weight of the filling compound.

All the filling compounds are adjusted with different quantities of toluhydroquinone to a pot life of from 4 to 5 minutes at 20° C.

Approximately 300 parts of filling compound are obtained.

D. Production of the coatings 100 g of filling compound are stirred with approximately 2 g of a standard commercial 50% benzoyl peroxide paste. The compound is then applied in a layer thickness of approximately 1 mm to degreased and roughened sheet steel panels and its sandability is assessed after certain periods.

| | Composition of the filling compound (in parts) | | | | | | | | |
|---|---|---|---|---|---|---|---|---|---|
| | Comparison | | | According to the invention | | | | | |
| | 1 | 2 | 3 | 4 | 5 | 6 | 7 | 8 | 9 |
| Polyester resin I | 100 | 100 | 100 | 200 | 100 | 100 | 100 | | |
| Polyester resin II | | | | | | | | 100 | 100 |
| Accelerator I | 3.6 | | | | | 1.8 | | | 1.26 |
| Accelerator II | | 1.59 | | | | | | | |
| Accelerator III | | | 1.7 | | | | | | |
| Accelerator IV | | | | 1.92 | | 0.96 | | 1.35 | 0.69 |
| Accelerator V | | | | | 1.74 | | | | |
| Accelerator VI | | | | | | 2.76 | | | 1.95 |
| Accelerator VII | | | | | | | 1.92 | | |
| Total of fillers | 197 | 197 | 197 | 197 | 197 | 197 | 197 | 197 | 197 |

E. Performance tests

1. Discolouration

Discolouration is determined as a function of time. To shorten the storage times, the filling compounds are stored at 50° C. in tin cans and tested after various times. Assessment was based on the following scale:

0 = no discolouration
1 = very faint discolouration
2 = clearly visible discolouration
3 = serious discolouration

2. Sandability

Sandability is determined at various times after addition of the peroxide by the hardened filling compound being manually sanded by one and the same person using medium-grain (number 80) sandpaper. Both the quantity of filling compound removed and also the degree of fouling of the sandpaper are assessed. Assessment is carried out on the following scale:

1 = very high abrasion, very good sandability
2 = high abrasion, good sandability
3 = moderate abrasion, moderate sandability,
4 = hardly any abrasion, poor sandability,
5 = non-sandable (compound adheres to the surface of the sandpaper).

3. Shelf life

The polyester filling compounds are stored at 50° C. in tin cans. The times quoted indicate the earliest time at which the beginnings of polymerisation are observed.

The performance properties tested are set out in the following Table.

| Example No. | Discolouration after | | | Dry sandability after | | | Shelf life months |
|---|---|---|---|---|---|---|---|
| | 5 | 10 | 20 days | 15 | 20 | 30 minutes | |
| 1 | 0 | 0 | 0 | 3 | 3 | 2 | 5 |
| 2 | 2 | 3 | 3 | 2 | 2 | 1 | 3 |
| 3 | 0 | 0 | 1 | 5 | 4 | 4 | 3 |

| Example No. | Discolouration after 5 | 10 | 20 days | Dry sandability after 15 | 20 | 30 minutes | Shelf life months |
|---|---|---|---|---|---|---|---|
| 4 | 0 | 0 | 0 | 2 | 2 | 1 | 4 |
| 5 | 0 | 0 | 1 | 3 | 2 | 1 | 4 |
| 6 | 0 | 0 | 0 | 2 | 1 | 1 | 5 |
| 7 | 0 | 0 | 0 | 2 | 2 | 1 | 4 |
| 8 | 0 | 0 | 0 | 1 | 2 | 2 | 3 |
| 9 | 0 | 0 | 1 | 1 | 1 | 2 | 4 |

We claim:

1. A composition comprising (a) an unsaturated polyester resin which is a mixture of from 30 to 75 parts by weight of α,β-ethylenically unsaturated polyester and 70 to 25 parts by weight of an unsaturated monomer copolymerizable therewith; (b) 1 to 10% by weight of an accelerator, based on said unsaturated polyester resin, said accelerator being of the formula

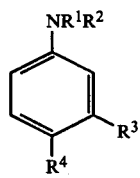

wherein $R^1$ and $R^2$ which may be the same or different are saturated or unsaturated, optionally OH-substituted hydrocarbon radicals containing from 1 to 18 carbon atoms, one of the two radicals $R^3$ and $R^4$ is an optionally phenyl-substituted $C_1$-$C_4$-alkyl radical or a $C_5$-$C_6$-cycloalkyl radical and the other of said radicals $R^3$ and $R^4$ is a halogen atom; (c) 0.01 to 0.1% by weight, based on unsaturated polyester resin, of at least one inhibitor and (d) 50 to 350 parts by weight of a filler based on each 100 parts by weight of polyester resin.

2. The composition of claim 1 wherein $R^1$ and/or $R^2$ each contains from 1 to 4 carbon atoms.

3. The composition of claim 1 wherein $R^1$ and/or $R^2$ each represents a β-hydroxyl-$C_2$-$C_3$-alkyl radical.

4. The composition of claim 1 wherein one of $R^3$ and $R^4$ is a fluorine, chlorine or bromine atom.

5. The composition of claim 1 wherein said accelerator is N,N-bis-(β-hydroxyethyl)-3-chloro-4-methyl aniline.

6. The composition of claim 1 wherein said accelerator is present in an amount of from 1 to 5% by weight, based on unsaturated polyester resin.

7. The composition of claim 1 wherein said accelerator is present in an amount of from 1.0 to 3% by weight, based on unsaturated polyester resin.

8. The composition of claim 1 wherein said inhibitor is chloranil, bromanil, benzoquinone, 2,5- or 2,6-dibutyl benzoquinone.